United States Patent Office 3,649,601
Patented Mar. 14, 1972

3,649,601
AROMATIC POLYIMIDES CONTAINING PERFLUOROALKYLENE GROUPS
John Phillip Critchley, Farnham, and William Alexander Lee, Camberley, England, assignors to National Research Development Corporation, London, England
No Drawing. Continuation-in-part of abandoned application Ser. No. 734,520, June 5, 1968. This application Sept. 29, 1970, Ser. No. 76,616
Int. Cl. C08g 20/32
U.S. Cl. 260—78 TF                            4 Claims

ABSTRACT OF THE DISCLOSURE

Aromatic polyimides are provided having the general formula

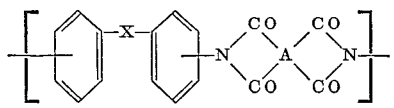

where A is a quadrivalent aromatic group represented by the formula

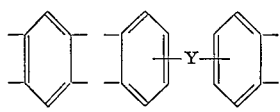

and X or Y or both is a perfluoroalkylene group —$(CF_2)_n$— where $n$ is an integer from two to eight inclusive and the remaining groups X and Y are direct link, —O—, —S—, —CO—, —$SO_2$— or —$CH_2$—.

This invention relates to novel polyimides, and is a continuation-in-part of our co-pending application Ser. No. 734,520 filed on June 5, 1968, and now abandoned.

Polyimides derived from exclusively aromatic starting materials are generally insoluble so that when the starting materials are heated together the mixture becomes solid before a high molecular weight is reached. When the reaction is carried out at ambient temperatures in a polar aprotic solvent it is possible to attain high molecular weight polyamic acids which can be dehydrated at high temperature, usually in the form of a film, to polyimides which possess outstanding thermal and chemical stability but which are insoluble and infusible.

Polyimides derived from aliphatic containing starting materials are usually soluble and thermoplastic. They are conveniently prepared by a fusion reaction whereby the polyimide is produced in one step as a potentially fabricable material. Unfortunately the stability of such polymers is considerably lowered by the presence of alkylene chains.

It would seem desirable to produce a polymer which combined if possible the stability of the exclusively aromatic polyimides with the mouldability of the aliphatic containing polyimides.

One object of the present invention is to produce novel polyimides which may have elastomeric properties over a wide temperature range.

A further object of the invention is to provide a process by which polyimides, which may have very desirable elastomeric properties and thermal stability, may be produced.

Another object of the invention is to provide a range of thermoplastic polyimides with moulding temperatures varying from below 200° C., up to about 450° C. which may have the high stability generally associated with aromatic polyimides.

In accordance with the present invention there are provided aromatic polyimides incorporating in the polymer chain fully fluorinated alkylene groups —$(CF_2)_n$—, where $n$ is an integer having a value from 2 to 8. It may be advantageous to introduce perfluoroalkyl groups pendant on aromatic groups in the polyimide chain. Such pendant groups may be present alone or in addition to the polyfluoralkylene units.

In accordance with the present invention there are provided aromatic polyimides capable of forming a film and containing repeating units which are represented by the formula

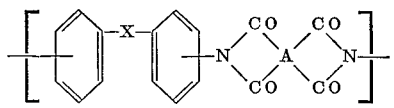

wherein X is selected from the group consisting of direct link —O—, —S—, —$SO_2$—, —CO—, —CONH—, —$CH_2$—, or —$(CF_2)_n$— where $n$ is an integer from two to eight inclusive and A is a quadrivalent aromatic group represented by one of the formulae

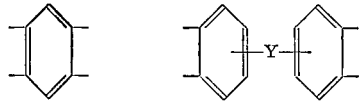

wherein Y is selected from the group consisting of direct link of —O—, —S—, —CO—, —$SO_2$—, —$CH_2$—, or —$(CF_2)_n$— where $n$ is an integer from two to eight inclusive and at least one of X or Y is a perfluoroalkylene group.

Advantageously if the linking groups X and Y are not fluorinated alkylene groups they should be heat resistant and typical aromatic polyimides are obtained if X is a fully fluorinated alkylene group —$(CF_2)_n$— and A is represented by one of the formulae

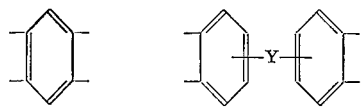

wherein Y is —CO—, or —O—. Other typical aromatic polyimides are obtained when A is represented by the formula

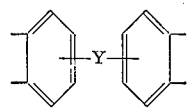

wherein Y is a fully fluorinated alkylene group

—$(CF_2)_n$— and X is —CO—, or —O—. Preferred aromatic polyimides are obtained when both X and Y are fully fluorinated alkylene groups —$(CF_2)_n$—, where $n$ is an integer from two to eight inclusive.

It is to be understood that hydrogen atoms attached to the aromatic nuclei in polyimides of the present invention may be replaced by atoms or groups, so long as such atoms or groups do not interfere with the thermal stability of the polyimide produced or with the process of manufacture as hereinafter disclosed.

It is also to be understood that the groups X and Y need not be entirely one or other of the possibilities mentioned but may be a mixture of the possibilities in varying proportions.

Polyimides in accordance with the invention are produced by any of the processes which are normally used for the preparation of polyimides, but in which either or both of the polymer precursors contains a perfluoroalkylene group and may additionally contain a perfluoroalkyl group.

Typical polymers in accordance with the invention may be prepared from for example an aromatic diamine and an aromatic dianhydride where either or both reactants have perfluoroaliphatic substitution. Alternatively polyimides may be formed by the method described in copending patent application Ser. No. 721,093, filed on Apr. 12, 1968 and its continuation-in-part Ser. No. 25,547, filed on Apr. 3, 1970, whereby a di(organocarbonyl) derivative of an aromatic diamine is melt polymerised with an aromatic tetracarboxylic acid or a derivative thereof where either or both reactants have perfluoroaliphatic substitution.

It is an important aspect of the invention that copolymers may be prepared by polycondensing starting materials comprising blends of unsubstituted and perfluoroaliphatic substituted compounds or mixtures of perfluoroalkylene substituted compounds wherein perfluoroalkylene units of different lengths are present. Copolymers produced in this way may have a wide range of properties and stabilities and one skilled in the art can select blends of starting materials which may produce thermoplastic polyimides with moulding temperatures varying from below 200° C. to about 450° C.

The polyfluoroaliphatic substituted compounds which are starting materials in the preparation of polyimides in accordance with the invention may conveniently be prepared from polyfluoroalkylene linked aromatic compounds.

U.S. patent specification No. 3,408,411 and copending U.S. Ser. No. 734,575, filed on June 5, 1968 describe processes whereby aromatic compounds are produced in which two aromatic nuclei are directly linked by a perfluoroalkylene group. These compounds are represented by the formula Ar—$CF_2$—$R_F$—$CF_2$—$Ar^1$ wherein Ar, $Ar^1$ may be the same or different and represent aromatic nuclei and $R_F$ represents a polyfluoroalkylene group. These compounds are prepared by heating together at a temperature of at least about 180° C. a diketo-compound represented by the formula Ar—CO—$R_F$—CO—$Ar^1$ and a halogenating agent such as phosphorus pentahalide $PX_5$, phosphorus trihalide $PX_3$ or a phosphorus trihalide/halogen mixture $PX_3/X_2$. The carbonyl groups of the diketo-compound are halogenated to dihalogenomethylene groups. Prolonged heating at temperatures of the order of 180 to 230° C. for at least 50 hours is generally necessary.

Preferred halogenating agents are those in which X is chlorine, i.e., phosphorous pentachloride, phosphorus trichloride or a mixture of phosphorus trichloride and chlorine. The aromatic nuclei, Ar and Ar′, may be substituted and the only limitation upon the substituents is that they should not be subject to a competing reacion with the halogenating agent.

The halogenated groups are converted to —$CF_2$— groups by treatment with any of the fluorinating agents known in the art, for example, antimony trifluoride in the presence of a suitable catalyst such as antimony pentachloride.

The diketo-compounds can be prepared by a Friedel-Crafts reaction between an aromatic compound and a diacidhalide derivative of a polyfluorodicarboxylic acid. Perfluoroalkylene substituted aromatic diamines are conveniently produced by nitration and reduction of compounds comprising perfluoroalkylene linked aromatic nuclei prepared in accordance with these copending patent applications.

Alternative starting materials such as di(organocarbonyl) derivatives of polyfluoroalkylene substituted diamines are prepared from the diamine, by, for example, treatment with organocarbonyl chloride.

Polyfluoroalkylene substituted tetraacids may be prepared by hydrolysis of tetraesters prepared by the method described in U.S. patent specification No. 3,408,411 and these may be dehydrated to produce a polyfluoroalkylene substituted dianhydride.

Other suitable starting materials which may be used together with polyfluoroaliphatic substituted materials to produce polyimides in accordance with the invention include the dianhydride, tetraester, or diester/diacid derivatives of pyromellitic acid, benzophenone-3,3′,4,4′-tetracarboxylic acid and diphenyl ether-3,3′,4,4′-tetracarboxylic acid, and aromatic diamines, or their di(organocarbonyl) derivatives such as diaminodiphenyl methane, diaminodiphenyl ether, diaminodiphenyl sulphone, diaminobenzophene, metaphenylene diamine and paraphenylene diamine. Similarly useful polyimides may be prepared incorporating such starting materials which are further substituted, particularly when the substituent is a perfluoroalkyl group or a perfluoroalkyl group.

Polymerisation methods available include melt polymerisation, that is heating together for a suitable length of time a mixture of dry starting materials generally giving rise to a polyimide directly, and solution polymerisation whereby a soluble polyamic acid is formed by heating the starting materials together, preferably in a polar aprotic solvent, such as dimethyl formamide. It has been found that melt polymerisation techniques are particularly useful when the diamine or diamine derivative contains a polyfluoroalkylene unit since the presence of a polyfluoroalkylene group renders the diamine less basic than is suitable for a solution polymerisation technique.

Polyimides in accordance with the invention, whilst having the high thermal stability generally associated with aromatic polyimides may have other useful and desirable properties such as fusibility, solubility and a relatively low glass transition temperature.

Typical examples of the preparation of polyimides in accordance with the invention will now be described.

EXAMPLE 1

1,5-bis(3-aminophenyl)decafluoropentane (4.34 g. 0.01 mole) and 1,3-bis(3,4-dicarboxyphenyl)hexafluoropropane dianhydride (4.44 g., 0.01 mole) were thoroughly mixed under dry conditions and heated together under an atmosphere of nitrogen for 5 hours at 170–180° C., a further 7 hours at 200–210° C. at 0.1 mm. Hg and then 5 hours at 230–240° C. at 0.1 mm. Hg. The crude polyimide formed (7.88 g., 94% yield) was dissolved in 700 ml. of chloroform and petroleum ether (B.P. 100–120° C.) was added as non-solvent to give 3 precipitated fractions. The first fraction (yield 45%) had a molecular weight of 24,000 and softened at 130–140° C. and showed elastomeric behaviour above this softening point up to 350° C. Its $T_G$ was 98° C. and at 400° C. it had a weight loss in air of 1.2% per hour.

EXAMPLE 2

The process described in Example 1 was repeated using as starting materials 1,3-bis(3-aminophenyl)hexafluoropropane (0.01 mole) and 1,3-bis(3,4-dicarboxyphenyl) hexafluoro-propane dianhydride (0.01 mole), yielding a polyimide having a $T_G$ of 83° C. and a softening point of 170–180° C.

EXAMPLE 3

The process described in Example 1 was repeated using as starting materials 1,3-bis(3-aminophenyl)hexafluoropropane (0.009 mole), 1,5-bis(3-aminophenyl)decafluoropentane (0.001 mole) and 1,3-bis(3,4-dicarboxyphenyl) hexafluoro-propane dianhydride (0.01 mole) giving a polymer having a softening point of 130–140° C. and showing elastomeric properties up to 350° C.

EXAMPLE 4

The process described in Example 1 was repeated using as starting materials 1,3-bis(3-aminophenyl)hexafluoropropane (0.001 mole) 1,5-bis(3-aminophenyl)decafluoropentane (0.009 mole) and 1,3-bis(3,4-dicarboxyphenyl) hexafluoro-propane dianhydride (0.01 mole) giving a tough, hard, polymer having a softening point of 130–140° C. and showing elastomeric behaviour up to 350° C.

EXAMPLE 5

The process described in Example 1 was repeated using as starting materials 1,3-bis(3-aminophenyl)hexafluoropropane (0.01 mole) and benzophenone-3,3',4,4'-tetracarboxylic acid dianhydride (0.01 mole) giving a hard, tough, polymer of softening point 210–220° C.

EXAMPLE 6

The process described in Example 1 was repeated using as starting materials 1,5-bis(3-aminophenyl)decafluoropentane (0.01 mole) and benzophenone-3,3',4,4'-tetracarboxylic acid dianhydride (0.01 mole), giving a hard, tough, polymer of softening point 260–270° C.

EXAMPLE 7

Bis(4-aminophenyl) ether (2.0 g., 0.01 mole) was transferred to a dry flask with 50 g. of dry dimethylformamide. 1,3-bis(3,4-dicarboxyphenyl)hexafluoro-propane dianhydride (4.44 g., 0.01 mole) was added to the vigorously stirred solution over 2–3 minutes, residual dianhydride was washed in with further dimethylformamide (8 g.). The mixture was then stirred for 1½ hours at room temperature; a small surge in temperature to 40° C. was noted on addition of the dianhydride, but this rapidly returned to room temperature.

During the 1½ hours the solution became considerably more viscous and a polyamic acid was formed. Thin layers of polyamic acid were cast onto glass plates and dried at 80° C. under nitrogen. The resulting films were readily removed from the plates as coherent, colourless, transparent materials, with characteristic infra red spectra.

These polyamic acid films were clamped to frames, and heated in a forced draft oven to 300° C. over a 3 hour period. The recovered films were transparent, and golden-yellow in colour. They were tough, being extremely resistant to creasing without sign of cracking; they showed typical imide infra red absorptions. The polyimide softened at 245–250° C., above which temperature elastomeric properties were shown to 350° C.; the material was insoluble in all organic solvents and had a $T_G$ of 220° C.

EXAMPLE 8

1,5 - bis(3 - aminophenyl)decafluoropentane (2.8 g., 0.0064 mole) and bis(3,4-dicarboxyphenyl) ether dianhydride (2.0 g., 0.0064 mole) were thoroughly mixed, under dry conditions. The mixture was slowly heated under an atmosphere of nitrogen to 75°–80°, when the first signs of melting were observed, then at 100°–110° for 1½ hours. The temperature was slowly raised to 115° and held therefor 1½ hours then again raised slowly to 156° and kept at this temperature for 2½ hours. The temperature was subsequently raised to 180° and kept there for 6 hours. At the end of this time the viscosity (0.5% solution in dimethylformamide) was measured showing $\eta_{inh}$=0.202. The reaction mixture was further heated at 190°/3 hours; 195°/3 hours; 200°/3 hours; 205°/1½ hours; 210°/1½ hours; 215°/3 hours; 220°/3 hours; 225°/3 hours. It had the following viscosities: after the heating at 210°, $\eta_{inh}$=0.205 (0.5% solution in dimethyl-formamide) and after the heating at 225°, $\eta_{inh}$=0.208 (0.5% solution in dimethyl-formamide).

The melt was heated for a further 10 hours at 240° at 0.1 mm. Hg. The crude polyimide formed (3.85 g., 91.7% yield) was dissolved in 500 ml. of chloroform, and petroleum ether (B.P. 100–120° C.) was added as nonsolvent, to give 3 precipitated fractions. The first fraction $\eta_{inh}$=0.56 (0.5% solution in DMF) softened at 152–158° C. it showed elastomeric (resilient) behaviour up to 230°, above this temperature although it was still somewhat resilient it became noticeably tacky and above 310° the polymer appeared to be quite soft. Its $T_G$, measured at 32° C./minute by differential scanning calorimetry, was 157° C.; measured dilatometrically $T_G$ (3½°/hour) was 120° C. At 400° C. it had a weight loss in air of 1.2% per hour measured over a 23 hour period.

EXAMPLE 9

1,3-bis(3-aminophenyl)hexafluoro-propane (2.002 g., 0.006 mole) and 1,7-bis(3,4-dicarboxyphenyl)tetradecafluoroheptane dianhydride (3.866 g., 0.006 mole) were mixed together in a dry, nitrogen atmosphere, the mixture heated in a stream of dry nitrogen at 140–150°/19 hours, 190°/19 hours, and up to 245°/7 hours, and finally heated in vacuo at 250°/18 hours, 265°/8 hours, and 270°/8 hours. The crude polyimide, inherent viscosity 0.31 in chloroform, was obtained in 92% yield. It was fractionally precipitated from chloroform solution with petroleum ether (100/120) to give a fraction (2.0 g.) inherent viscosity 0.7, elastomeric above its softening point (130°) with a $T_G$ 133° C. (measured at a heating rate of 32°/minute).

EXAMPLE 10

1,5-bis(3 - aminophenyl)hexafluoropropane (2.729 g., 0.0063 mole) and 1,7-bis(3,4-dicarboxyphenyl)tetradecafluoroheptane dianhydride (4.053, 0.0063 mole) were treated as in the previous example at 120–160°/3 hours, 175°/17 hours, 190°/8 hours, and 190–250°/3 hours under nitrogen before heating at 200°/2 hours in vacuo. The crude polyimide has inherent viscosity of 0.14 in chloroform. The polymer was further heat treated at 260°/16 hours after exposure to air, and this produced a polymer containing a large insoluble fraction (4.26 g., 65% yield) elastomeric from its softening temperature (110°) up to 390°, with a $T_G$ of 123° C. (measured at a heating rate of 32°/minute). The soluble polymer was fractionally precipitated as before to give a fraction (0.22 g.) of inherent viscosity 0.42 in chloroform with a $T_G$ of 113° (measured at a heating rate of 32°/minute).

We claim:
1. An aromatic polyimide capable of forming a film which consists essentially of a repeating unit represented by the formula

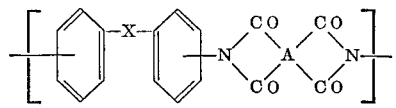

wherein X is selected from the group consisting of a direct link, —O—, —S—, —CO—, —SO$_2$—, —CONH—, —CH$_2$— or —(CF$_2$)$_n$— where $n$ is an integer from two to eight inclusive, and A is a quadrivalent aromatic group represented by one of the formulae

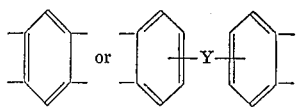

wherein Y is selected from the group consisting of a direct link, —O—, —S—, —CO—, —SO$_2$—, —CH$_2$— and —(CF$_2$)$_n$— where $n$ is an integer from two to eight inclusive, wherein at least one of X or Y is —CF$_2$—$_n$.

2. An aromatic polyimide as claimed in claim 1 wherein X is —(CF$_2$)$_n$— and A is a quadrivalent aromatic group represented by one of the formulae

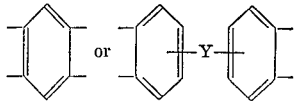

wherein Y is —CO—, or —O—.

3. An aromatic polyimide as claimed in claim 1 wherein A is a quadrivalent aromatic group represented by the formula

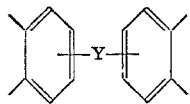

wherein Y is —$(CF_2)_n$— and X is —CO—, or —O—.

4. An aromatic polyimide as claimed in claim 1 wherein A is a quadrivalent aromatic group represented by the formula

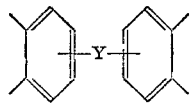

and both X and Y are —$(CF_2)_n$— and the value of $n$ may be the same or different in both groups.

References Cited
UNITED STATES PATENTS

| 3,179,630 | 4/1965 | Endrey | 260—78 |
| 3,356,648 | 12/1967 | Rogers | 260—47 |

FOREIGN PATENTS

| 570,858 | 7/1945 | Great Britain | 260—78 |

WILLIAM H. SHORT, Primary Examiner

L. L. LEE, Assistant Examiner

U.S. Cl. X.R.

117—161 P, 161 UN; 260—324, 338 F, 47 CP, 65